US012552600B1

(12) United States Patent
Hanrahan

(10) Patent No.: US 12,552,600 B1
(45) Date of Patent: Feb. 17, 2026

(54) BLACK BEAR AND OTHER ANIMAL PROOF GARBAGE CART/CAN LOCKS AND METHOD OF USE

(71) Applicant: Patrick Hanrahan, Earlysville, VA (US)

(72) Inventor: Patrick Hanrahan, Earlysville, VA (US)

(73) Assignee: Primacy Solutions, LLC, Earlysville, VA (US)

( * ) Notice: Subject to any disclaimer, the term of this patent is extended or adjusted under 35 U.S.C. 154(b) by 0 days.

(21) Appl. No.: 18/759,000

(22) Filed: Jun. 28, 2024

Related U.S. Application Data

(60) Provisional application No. 63/603,714, filed on Nov. 29, 2023.

(51) Int. Cl.
*B65D 45/00* (2006.01)
*B65F 1/14* (2006.01)
*B65F 1/16* (2006.01)

(52) U.S. Cl.
CPC ...... *B65F 1/1615* (2013.01); *B65F 2210/148* (2013.01)

(58) Field of Classification Search
CPC .... B65F 1/16; B65F 1/1615; B65F 2210/148; B65F 1/14; Y10S 220/908; Y10S 292/11
USPC ......................................... 220/324, 315, 730
See application file for complete search history.

(56) References Cited

U.S. PATENT DOCUMENTS

| | | | | | |
|---|---|---|---|---|---|
| 2,998,276 | A * | 8/1961 | Shettler | B65F 1/1615 | 292/288 |
| 3,980,202 | A * | 9/1976 | Monyak | B65D 45/00 | 292/288 |
| 4,371,092 | A * | 2/1983 | Teague | B65F 1/1615 | D8/344 |
| 4,413,851 | A * | 11/1983 | Ritter | B65F 1/1615 | 292/259 R |
| 4,520,945 | A * | 6/1985 | Hodge | B65D 55/14 | 70/164 |
| 6,230,920 | B1 * | 5/2001 | Porter | B65F 1/1615 | 220/908 |
| 6,880,717 | B1 * | 4/2005 | O'Conor | B65F 1/1615 | 292/288 |
| 7,086,557 | B2 * | 8/2006 | Miller | B65F 1/1615 | 220/908 |
| 11,970,332 | B1 * | 4/2024 | Peng | B65F 1/0053 | |
| D1,079,541 | S * | 6/2025 | Ouyang | D11/216 | |
| 2005/0061824 | A1 * | 3/2005 | Miller | B65F 1/1615 | 220/908 |
| 2006/0169696 | A1 * | 8/2006 | Taylor | B65D 55/16 | 220/730 |
| 2007/0023431 | A1 * | 2/2007 | Rouns | E05C 1/12 | 220/908 |
| 2007/0090114 | A1 * | 4/2007 | Rouns | B65F 1/1615 | 220/908 |

(Continued)

OTHER PUBLICATIONS https://trashlockers.com/products/ultimate-trash-locks?variant=46269457957156 (Year: 2025).*
U.S. Appl. No. 17/092,302, filed Nov. 8, 2020, Hanrahan.

*Primary Examiner* — Gideon R Weinerth
(74) *Attorney, Agent, or Firm* — William Gray Mitchell

(57) ABSTRACT

A system comprising multiple locking devices comprising straps, buckles and fasteners for attachment to a garbage can lid to prevent wild animals from accessing the contents of the can.

5 Claims, 4 Drawing Sheets

FIG. 3

(56) References Cited

U.S. PATENT DOCUMENTS

| | | | | |
|---|---|---|---|---|
| 2008/0169288 | A1* | 7/2008 | Dawn | B65F 1/1615 220/315 |
| 2008/0169289 | A1* | 7/2008 | Dawn | B65F 1/1615 220/315 |
| 2010/0200604 | A1* | 8/2010 | Sharma | B65F 1/1615 220/754 |
| 2014/0325805 | A1* | 11/2014 | Troiano | F16B 45/045 24/600.5 |
| 2015/0090719 | A1* | 4/2015 | Lyon | B65F 1/1615 220/323 |
| 2016/0052714 | A1* | 2/2016 | McDade | B65F 1/1615 220/730 |
| 2017/0320667 | A1* | 11/2017 | Stone | E05B 63/143 |
| 2021/0032022 | A1* | 2/2021 | Martin, II | B65F 1/02 |
| 2021/0139236 | A1* | 5/2021 | Hanrahan | B65F 1/1615 |
| 2021/0339947 | A1* | 11/2021 | Gause | B65F 1/1615 |
| 2021/0339948 | A1* | 11/2021 | McCloughen | B65F 1/1615 |
| 2022/0127076 | A1* | 4/2022 | McDade | B65F 1/1615 |
| 2022/0297933 | A1* | 9/2022 | Elaywan | B65F 1/1646 |
| 2022/0380122 | A1* | 12/2022 | Martin, II | B65F 1/1646 |
| 2022/0412135 | A1* | 12/2022 | Manssourian | B65F 1/1646 |
| 2025/0122009 | A1* | 4/2025 | Horwood | B65F 1/1615 |
| 2025/0296772 | A1* | 9/2025 | McCloughen | B65F 1/1615 |

* cited by examiner

BLACK BEAR AND OTHER ANIMAL PROOF GARBAGE CART/CAN LOCKS AND METHOD OF USE

CROSS REFERENCE TO RELATED APPLICATIONS

Not applicable

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a garbage can lid lock to prevent large animals, specifically black bears, from accessing garbage can contents.

Background of the Invention

Locking systems for garbage can lids to prevent wild and domesticated animals from accessing the cans are known. Light systems using straps or cordage are often sufficient to stop smaller animals such as raccoons, but larger animals such as black bears have proven difficult to deter, even with stout and abrasive-resistant materials.

What is needed is a system of lid locks sufficiently resilient to prevent bears from using teeth and claws to open garbage cans by breaking the locks or the straps. The system needs to be easy to secure and release so it can be quickly secured or released by the consumer and the waste company.

BRIEF SUMMARY OF THE INVENTION

In a preferred embodiment, a system for locking a garbage can lid comprising at least four locking devices, each locking device comprising: a strap, the strap comprising a first segment and a second segment, each of the first segment and the second segment comprising a first end and a second end, the first end of each of the first segment and the second segment defining an aperture; a two-piece buckle, a first piece of the two piece buckle fixedly coupled to the first segment second end, a second piece of the two piece buckle fixedly coupled to the second segment second end; and a pair of fasteners, a first fastener of the pair of fasteners constructed to couple the first segment first end to a garbage can lid, a second fastener of the pair of fasteners constructed to couple the second segment first end to a garbage can body; wherein each buckle is arranged on the garbage can lid no less than 1"-3" away from an edge and each first fastener is attached to the garbage can lid no less than 1" beyond the related buckle.

In another preferred embodiment, the system as described herein, wherein a fastener is coupled to the first segment first end to reinforce the aperture of the first segment first end.

In another preferred embodiment, the system as described herein, wherein each strap is sized such that each segment fit tightly over the garbage can lid and/or garbage can body surfaces and the closed buckle cannot be raised from the garbage can lid surface.

In another preferred embodiment, the system as described herein, wherein the straps are constructed from polyester with a tensile strength of 2000 pounds or more.

In another preferred embodiment, the system as described herein, wherein the straps are constructed of a material with an ANSI/ISEA cut/abrasion resistance level of 4 or more.

In another preferred embodiment, the system as described herein, wherein the buckles are constructed of either high-strength polyacetal or aluminum.

In another preferred embodiment, a method of using the system of claim 1, comprising the steps of:

Attaching a first strap segment to a garbage can body at a first end of the first strap segment with a fastener;

Attaching a second strap segment to a garbage can lid at a first end of each second strap segment with a fastener;

Attaching a first piece of a two part buckle to a second end of the first strap segment;

Attaching a second piece of a two part buckle to a second end of the second strap segment;

Adjusting each strap segment so that the first and second pieces of the two part buckle connect flush with the garbage can lid, no less than 1"-3" from an edge of the lid;

Completing the arrangement of a locking device by engaging the first and second pieces of the two part buckle; and Repeating steps a-f to complete the arrangement of additional locking devices.

DETAILED DESCRIPTION OF THE INVENTION

Figure 1:
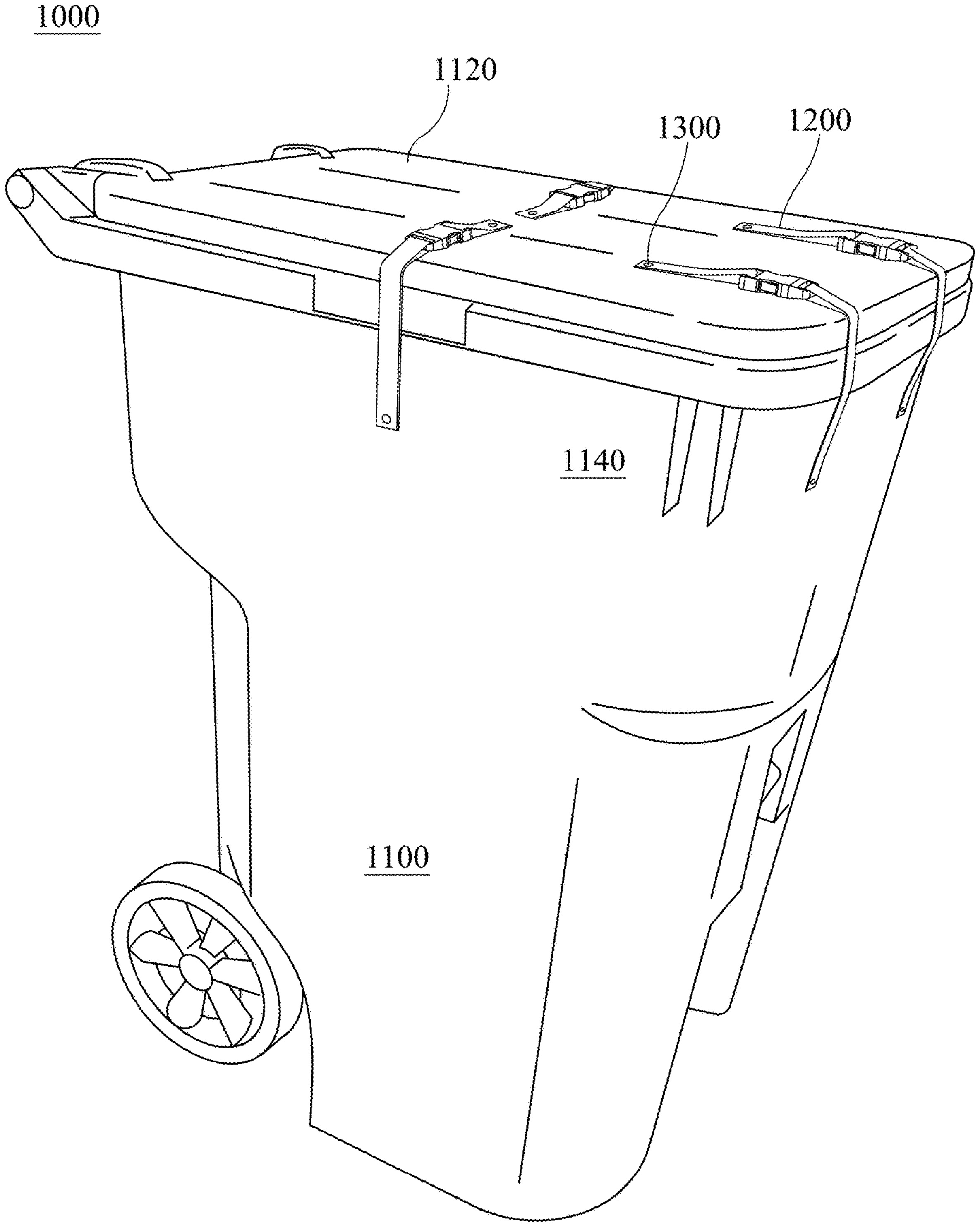
FIG. 1 illustrates a perspective view of a garbage can lid lock system in accordance with the present invention.

The invention comprises a system of a plurality of locking devices for attaching to a garbage can to stop black bears, raccoons or other animals from getting to the contents of the can. The locking device also stops garbage can covers from coming off due to high winds.

Each locking device comprises a strap in two segments, a two-piece buckle and a pair of fasteners. Each of the first segment and second segment comprises a first end and a second end. The first end of the first segment and the second segment defines an aperture. The locking device is constructed to couple a lid of a garbage can to the body of a garbage can, with each strap running over the edge of the garbage can lid on an edge other than the hinged edge.

Importantly, each aperture between strap segments should be located against the surface of the garbage can lid, and not over the gap between the edge of the lid and the top of the can body. Positioning of a buckle over such gap presents a bear or other animal with an opening to claw and bite the buckle, putting greater stress on the buckle and increasing the chance of breakage or failure. Placing the buckle against the lid surface reduces the availability of the buckle to attack and thus failure. The placement of the buckle on the lid also reduces the stress put on the buckle by 30 to 40% since the force applied by a large animal will generally be on the lower half of the strap below the lid and the lid edge will mitigate that force.

Further, each strap should be sized, together with the buckle, such that the entirety of the strap is held as tightly as possible to the surface of the garbage can and lid. With a fully taught strap, the buckle itself should also rest on the top of the lid and firmly resist any attempt to lift the buckle while it remains closed. Again, this positioning lessens the chance of an animal opening or breaking the buckle.

The straps can be made of webbing of either natural or synthetic fiber, preferably polyester. In a preferred embodiment, the strap material is woven or mesh and has an ANSI/ISEA cut/abrasion resistance level of 4 or more. In a more preferred embodiment, the resistance level is 5 or 6. The straps must also be weather resistant allowing to be in an outdoor environment continually for five or more years. They also need to be able to withstand hundreds if not thousands of pounds of force without breaking. In a preferred embodiment, the straps employ seat belt fabric, which is capable of supporting 2,000-6,000 pounds.

Each buckle will preferably be a commercially available two-piece, snap-fit variety buckle with release buttons on either side. The buckle is opened or released when pressure is applied to each release button simultaneously. In an alternate embodiment, each buckle comprises a third pressure point or release button in addition to the two side release buttons, so that three points must be pressed to allow the buckle to open. The buckles must not only be strong but be able to withstand the yanking motions of a bear trying to gain entry to the trash cart. The stronger buckle is not the best buckle if it cannot remain secure under these types of forces.

All buckles are heavily constructed to withstand high force bites from bears and other animals. In a preferred embodiment, each buckle is constructed of high-strength polyacetal, aluminum, or a similar commercially available polymer or metal material.

DETAILED DESCRIPTION OF THE FIGURES

FIG. 1 shows a perspective view of an exemplary embodiment of a system 1000, which comprises a garbage can 1100, comprising four separate locking devices 1200. The pictured embodiment simultaneously uses at least four locking devices in the system, with at least one device overlaying each non-hinged edge of the garbage can lid 1120 to a garbage can body 1140 of garbage can 1100. In the version of FIG. 1, the front edge of the lid features two locking devices 1200 on the front edge and one locking device each on the side edges, each such device attached to the garbage can lid and garbage can body with fasteners 1300. Each fastener is threaded through an aperture in each strap and in the underlying garbage can lid or body (apertures not pictured).

Figure 2:
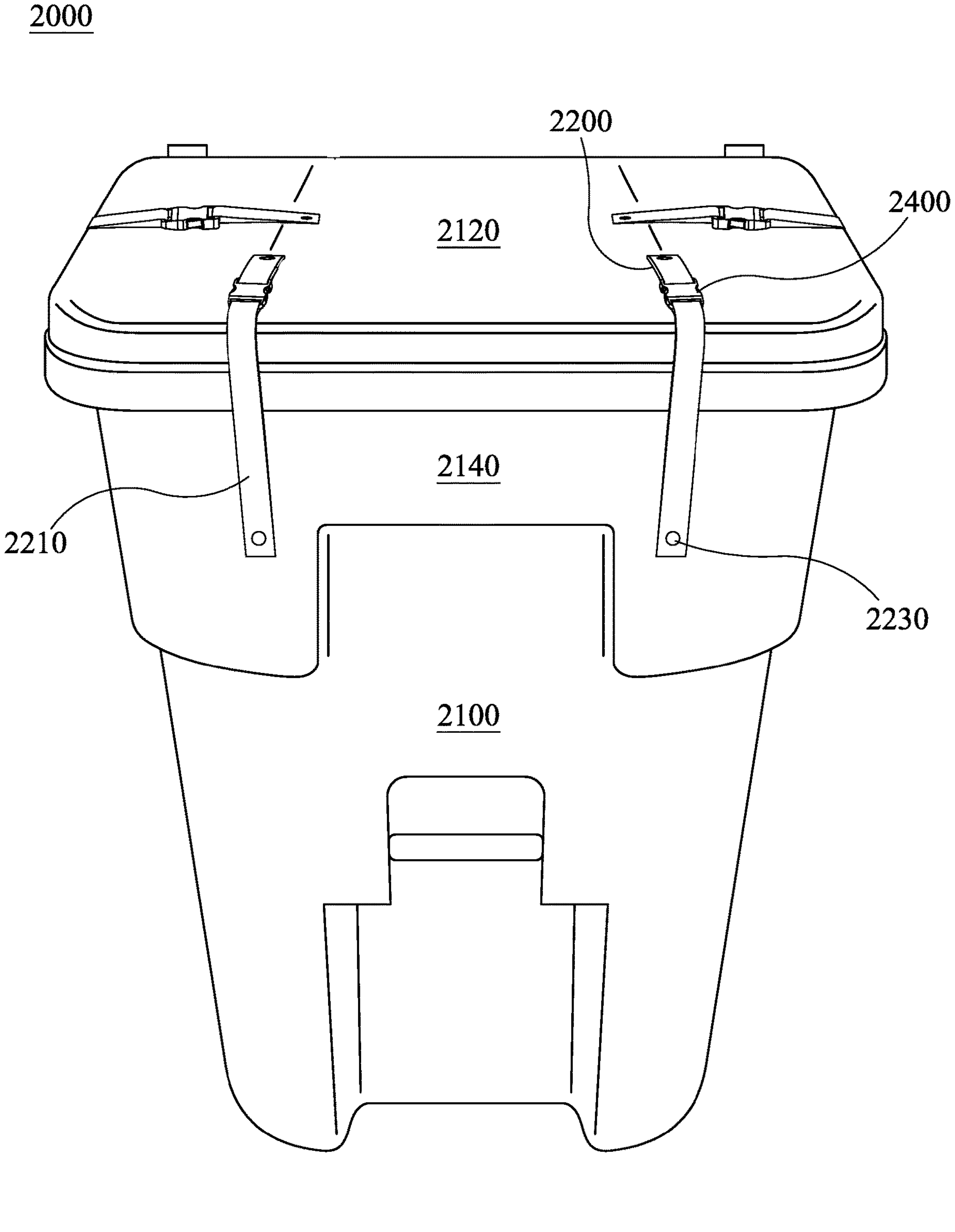
FIG. 2 illustrates a front view of the system according to FIG. 1.

FIG. 2 shows a perspective view of an exemplary embodiment of a system 2000, which comprises a garbage can 2100, a plurality of locking devices 2200. FIG. 2 illustrates an exemplary spacing of first locking device 2200, on garbage can 2100, wherein each strap segment 2210 is held taught against the surface of both the garbage can lid 2120 and garbage can body 2140 by fasteners 2230, and each buckle 2400 is held flush against the lid and away from the gap between the lid edge and can body, so as to minimize an animal's ability to lift and mangle the buckle or the strap.

Figure 3:
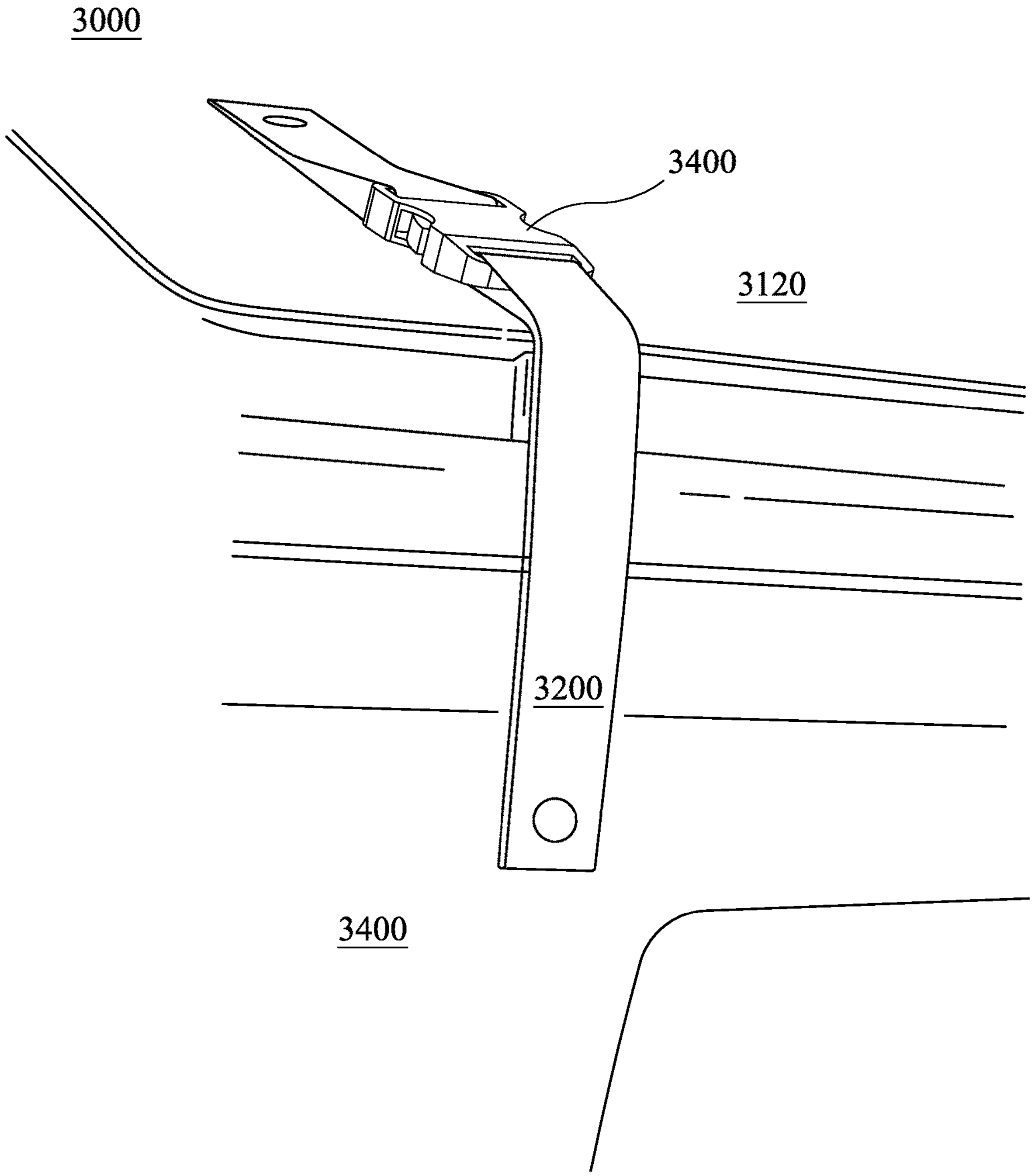
FIG. 3 illustrates a close-up view of a single locking device from the system of FIG. 1, deployed on a garbage can.

FIG. 3 shows a perspective view of an exemplary embodiment of a locking device 3200, fastened to each of a garbage can lid 3120 and garbage can body 3140. Of note, the buckle 3400 is positioned so as not to extend over the edge of the lid, where it would provide an animal with a gap to exert leverage against the buckle. Instead, the buckle is held fast against the surface of the lid.

Figure 4:
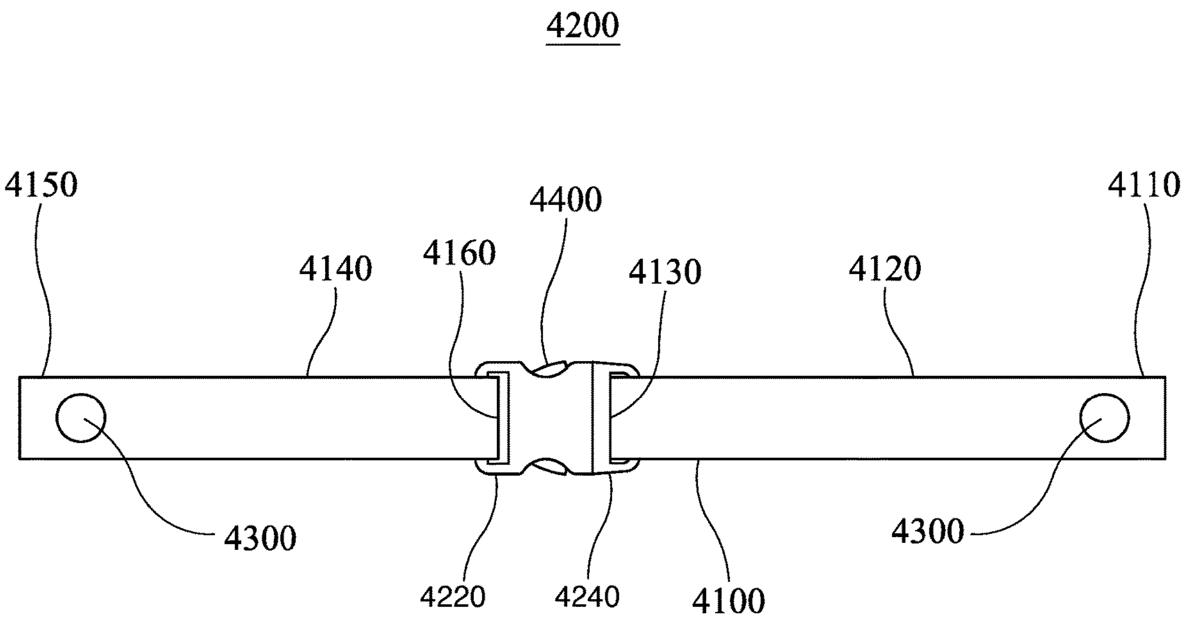
FIG. 4 illustrates an isolated view of a single locking device from the system of FIG. 1.

FIG. 4 shows a perspective view of a locking device 4200, which comprises a strap 4100 embodied as two pieces 4120,4140, a dual-release buckle 4400 embodied as two pieces 4220,4240 and a pair of fasteners 4300. In certain exemplary embodiments, strap 4100 can comprise polyester, polypropylene or a material of equal or greater strength. In certain exemplary embodiments, strap 4100 and/or two piece buckle 4400 can have tensile/break strengths of 2000 lbs or greater. Pair of fasteners 4300 can provide strength to resist removal by tearing by an animal such as a large black bear. Each fastener attaches the strap to the garbage can via corresponding holes in each strap segment and the garbage can lid or body. In the illustrated embodiment, pair of fasteners are hex head cap screws that are coupled to the garbage can via threaded hex nuts, but fasteners may be taken from any commercially available type of nut, screw, pin, grommet or similar fastener.

Each of first segment 4120 and second segment 4140 comprises a first end (first segment first end 4110 and second segment first end 4150) and a second end (first segment second end 4130 and second segment second end 4160). The first end of each of first segment and second segment each accommodate a fastener 4300. Locking device 4200 is constructed to couple a lid (see lid 1120 of FIG. 1) of a garbage can (see garbage can 1100 of FIG. 1) to a body (see body 1140 of FIG. 1) of the garbage can (see garbage can 1100 of FIG. 1).

A first piece 4420 of two-piece buckle 4400 can be fixedly coupled to first segment second end 4130. A second piece 4440 of two-piece buckle can be fixedly coupled to second segment second end 4160. The pictured buckle is of a dual-release, side push-button variety, but can also be embodied as D rings, a ratchet buckle, plate buckle, clip buckle or any other known variety.

A first fastener 4300 is arranged to fasten the first segment first end 4110 to a lid of a garbage can (see garbage can 1100 of FIG. 1).

The second fastener 4300 is arranged to fasten second segment first end 4150 to a body (see body 1140 of FIG. 1) of the garbage can (see garbage can 1100 of FIG. 1). In an alternate embodiment, two or more fasteners may be used for any given strap segment.

Locking device 4200 will preferably be one of a plurality of locking devices securing the lid (see lid 1120 of FIG. 1) of the garbage can (see garbage can 1100 of FIG. 1) depending on the level of security desired.

Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A system for locking a garbage can lid comprising at least four locking devices, each locking device comprising:

a strap, the strap comprising a first segment and a second segment, each of the first segment and the second segment comprising a first end and a second end, the first end of each of the first segment and the second segment defining an aperture;

a two-piece buckle, a first piece of the two piece buckle fixedly coupled to the first segment second end, a second piece of the two piece buckle fixedly coupled to the second segment second end; and a pair of fasteners, a first fastener of the pair of fasteners constructed to couple the first segment first end to a garbage can lid, a second fastener of the pair of fasteners constructed to couple the second segment first end to a garbage can body;

wherein each buckle is arranged on the garbage can lid no less than 1"-3" away from an edge and each first fastener is attached to the garbage can lid no less than 1" beyond the related buckle and wherein each strap is sized such that each segment and each buckle fits tightly over the garbage can lid and/or garbage can body surfaces and the segments and buckles cannot be raised from the garbage can lid surface.

2. The system of claim 1, wherein a grommet is coupled to the first segment first end to reinforce the aperture of the first segment first end.

3. The system of claim 1, wherein the straps are constructed from polyester with a tensile strength of 2000 pounds or more.

4. The system of claim 1, wherein the straps are constructed of a material with an ANSI/ISEA cut/abrasion resistance level of 4 or more.

5. The system of claim 1, wherein the buckles are constructed of either high-strength polyacetal or aluminum.

* * * * *